United States Patent
Hijikata et al.

(10) Patent No.: US 12,018,458 B2
(45) Date of Patent: Jun. 25, 2024

(54) CONSTRUCTION MACHINE

(71) Applicant: Hitachi Construction Machinery Co., Ltd., Tokyo (JP)

(72) Inventors: Seiji Hijikata, Tsukuba (JP); Yasutaka Tsuruga, Ryugasaki (JP); Kenji Hiraku, Kasumigaura (JP); Masatoshi Hoshino, Tsuchiura (JP)

(73) Assignee: Hitachi Construction Machinery Co., Ltd., Tokyo (JP)

( * ) Notice: Subject to any disclaimer, the term of this patent is extended or adjusted under 35 U.S.C. 154(b) by 0 days.

(21) Appl. No.: 17/802,745

(22) PCT Filed: Apr. 7, 2021

(86) PCT No.: PCT/JP2021/014801
§ 371 (c)(1),
(2) Date: Aug. 26, 2022

(87) PCT Pub. No.: WO2021/256060
PCT Pub. Date: Dec. 23, 2021

(65) Prior Publication Data
US 2023/0084767 A1    Mar. 16, 2023

(30) Foreign Application Priority Data

Jun. 17, 2020    (JP)  .................... 2020-104904

(51) Int. Cl.
*E02F 9/22*    (2006.01)
*F15B 11/028*    (2006.01)
*F15B 11/08*    (2006.01)

(52) U.S. Cl.
CPC .......... *E02F 9/2217* (2013.01); *E02F 9/2221* (2013.01); *E02F 9/2285* (2013.01);
(Continued)

(58) Field of Classification Search
CPC ...... E02F 9/2285; E02F 9/2221; E02F 9/2217
See application file for complete search history.

(56) References Cited

U.S. PATENT DOCUMENTS

| | | |
|---|---|---|
| 9,879,404 B2 | 1/2018 | Schroeder et al. |
| 2016/0017897 A1 | 1/2016 | Kanenawa et al. |
| 2017/0241454 A1* | 8/2017 | Hahn ...................... F15B 1/027 |

FOREIGN PATENT DOCUMENTS

| | | |
|---|---|---|
| JP | 2009-275769 A | 11/2009 |
| JP | 2009-275771 A | 11/2009 |

(Continued)

OTHER PUBLICATIONS

International Preliminary Report on Patentability (PCT/IB/338 & PCT/IB/373) issued in PCT Application No. PCT/JP2021/014801 dated Dec. 29, 2022, including English translation of document C2 (Japanese-language Written Opinion (PCT/ISA/237), filed Aug. 26, 2022 (seven (7) pages).

(Continued)

*Primary Examiner* — Kenneth Bomberg
*Assistant Examiner* — Daniel S Collins
(74) *Attorney, Agent, or Firm* — Crowell & Moring LLP

(57) ABSTRACT

It is an object of the present invention to provide a construction machine capable of efficiently driving a hydraulic cylinder by an accumulator. Thus, the construction machine includes a first control valve disposed in a first hydraulic fluid line connecting a bottom-side fluid chamber of a hydraulic cylinder with an accumulator, and a second control valve disposed in a second hydraulic fluid line connecting a rod-side fluid chamber of the hydraulic cylinder with a tank. The construction machine further includes a third control valve disposed in a third hydraulic fluid line connecting the rod-side fluid chamber with the accumulator, and a fourth control valve disposed in a fourth hydraulic fluid line connecting a line part of the first hydraulic fluid line, which connects the bottom-side fluid chamber with the third control valve, and a line part of the third hydraulic fluid line, which connects the rod-side fluid chamber with the third control valve, with each other.

4 Claims, 5 Drawing Sheets

(52) U.S. Cl.
CPC ............ *F15B 11/028* (2013.01); *F15B 11/08* (2013.01); *B60Y 2200/412* (2013.01)

(56) References Cited

FOREIGN PATENT DOCUMENTS

| | | |
|---|---|---|
| JP | 2011-69432 A | 4/2011 |
| JP | 2014-173615 A | 9/2014 |
| WO | WO 2013/059020 A1 | 4/2013 |

OTHER PUBLICATIONS

International Search Report (PCT/ISA/210) issued in PCT Application No. PCT/JP2021/014801 dated Jun. 29, 2021 with English translation (four (4) pages).
Japanese-language Written Opinion (PCT/ISA/237) issued in PCT Application No. PCT/JP2021/014801 dated Jun. 29, 2021 (five (5) pages).
Extended European Search Report issued in European Application No. 21826770.6 dated Jan. 29, 2024 (8 pages).
Korean-language Office Action issued in Korean Application No. 10-2022-7029436 dated Jan. 16, 2024 with English translation (10 pages).

* cited by examiner

CONSTRUCTION MACHINE

TECHNICAL FIELD

The present invention relates to a construction machine such as a hydraulic excavator.

BACKGROUND ART

According to Patent Document 1, the bottom side and the rod side of the boom cylinder are made to communicate with each other at the time of a boom lowering operation, and further the bottom side is connected to the accumulator, whereby the return fluid from the boom cylinder can be accumulated in the accumulator with a rise in pressure. Further, in Patent Document 2, the hydraulic fluid accumulated in the accumulator is supplied to the boom cylinder, and the flow rate to the boom cylinder from a pump is reduced accordingly, whereby fuel cost can be reduced.

PRIOR ART DOCUMENT

Patent Documents

Patent Document 1: JP-2009-275769-A
Patent Document 2: JP-2009-275771-A

SUMMARY OF THE INVENTION

Problem to be Solved by the Invention

However, according to the configurations of Patent Document 1 and Patent Document 2, pressure accumulation of the accumulator is conducted by raising the bottom pressure of the boom cylinder, so that the pressure of the accumulator is also raised. When the hydraulic fluid is supplied to the boom cylinder from the accumulator in which pressure accumulation has been thus conducted to a high pressure, a large pressure loss is generated, and there is a fear that the energy accumulated in the accumulator may not be effectively usable. Here, the bottom pressure of the boom cylinder varies according to the posture of the front implement including the arm and the bucket. For example, in the crowding posture of the arm and the bucket, the bottom pressure of the boom is lowered. If the hydraulic fluid is supplied to the bottom side of the boom cylinder from the accumulator in that state, a large pressure loss is generated.

The present invention has been made in consideration of the above problem. It is an object of the present invention to provide a construction machine capable of efficiently driving a hydraulic cylinder by an accumulator.

Means for Solving the Problem

To achieve the above object, according to the present invention, there is provided a construction machine including: a tank that reserves a hydraulic fluid; a hydraulic cylinder; an accumulator that accumulates a return fluid from the hydraulic cylinder; a first control valve disposed in a first hydraulic fluid line connecting a bottom-side fluid chamber of the hydraulic cylinder with the accumulator; and a second control valve disposed in a second hydraulic fluid line connecting a rod-side fluid chamber of the hydraulic cylinder with the tank, in which the construction machine further includes: a third control valve disposed in a third hydraulic fluid line connecting the rod-side fluid chamber with the accumulator; and a fourth control valve disposed in a fourth hydraulic fluid line connecting a line part of the first hydraulic fluid line, the line part connecting the bottom-side fluid chamber with the first control valve, and a line part of the third hydraulic fluid line, the line part connecting the rod-side fluid chamber with the third control valve, with each other.

According to the present invention configured as above, at the time of shrinking driving of the hydraulic cylinder, the fourth control valve is opened to cause the bottom side of the hydraulic cylinder to communicate with the rod side and raise the pressure on the bottom side, and the first control valve is opened to cause the bottom side to communicate with the accumulator, whereby the return fluid from the bottom side can be accumulated in the accumulator at a high pressure. In addition, at the time of driving of the hydraulic cylinder to extend, the fourth control valve is closed to interrupt the communication between the bottom side and the rod side of the hydraulic cylinder, and the first control valve is opened to cause the bottom side to communicate with the accumulator, and either one of the second control valve and the third control valve is opened, whereby the hydraulic fluid can be supplied from the accumulator to the bottom side while adjusting a back pressure on the rod side. As a result, the pressure difference between the accumulator and the bottom side of the hydraulic cylinder 1 can be reduced, so that pressure loss at the first control valve can be reduced.

Advantages of the Invention

According to the construction machine of the present invention, the hydraulic cylinder can be efficiently driven by the accumulator.

MODES FOR CARRYING OUT THE INVENTION

Figure 1:
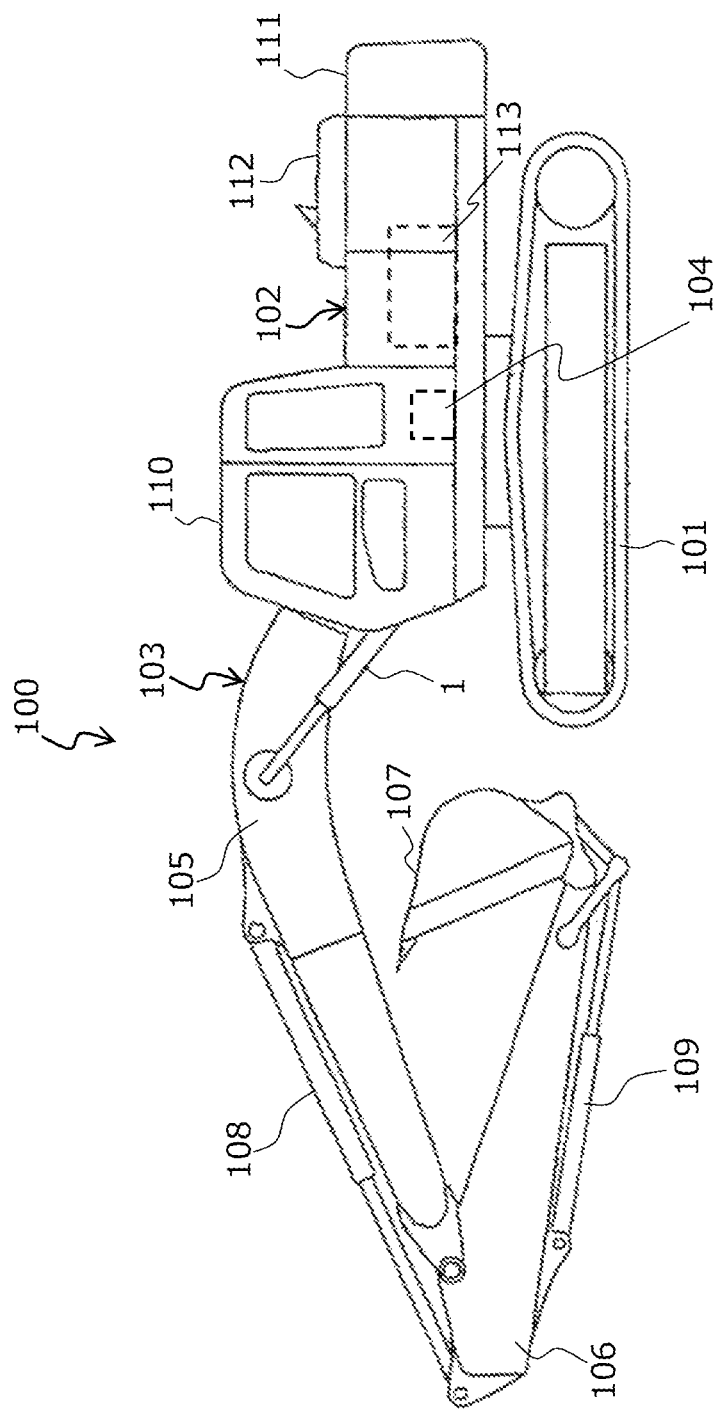
FIG. 1 is a side view of a hydraulic excavator according to embodiments of the present invention.

A construction machine according to embodiments of the present invention will be described, taking a hydraulic excavator as an example of the construction machine and referring to the drawings. Note that in each drawing, equivalent members are denoted by the same reference characters and overlapping descriptions will be omitted as required.

FIG. 1 is a side view of a hydraulic excavator according to the present embodiments.

As depicted in FIG. 1, the hydraulic excavator 100 includes a track structure 101, a swing structure 102 swingably disposed on the track structure 101 to constitute a machine body, and a work device 103 which is mounted to the swing structure 102 in a vertically rotatable manner and which performs excavation work of soil or the like. The swing structure 102 is driven by a swing motor 104.

The work device 103 includes a boom 105 mounted to the swing structure 102 in a vertically rotatable manner, an arm 106 mounted to the tip of the boom 105 in a vertically rotatable manner, and a bucket 107 mounted to the tip of the arm 106 in a vertically rotatable manner. The boom 105 is driven by a boom cylinder 1, the arm 106 is driven by an arm cylinder 108, and the bucket 107 is driven by a bucket cylinder 109.

A cab 110 is provided at a front side position of the swing structure 102, and a counter weight 111 for securing weight balance is provided at a rear side position. A machine room 112 is provided between the cab 110 and the counter weight 111, and an engine, a hydraulic pump, a control valve 113, and the like are accommodated in the machine room 112. The control valve 113 controls the flow of a hydraulic fluid supplied from the hydraulic pump to each actuator.

The hydraulic excavator 100 according to the present embodiment has mounted thereon a hydraulic drive system described in each of the following embodiments.

Embodiment 1

Figure 2:
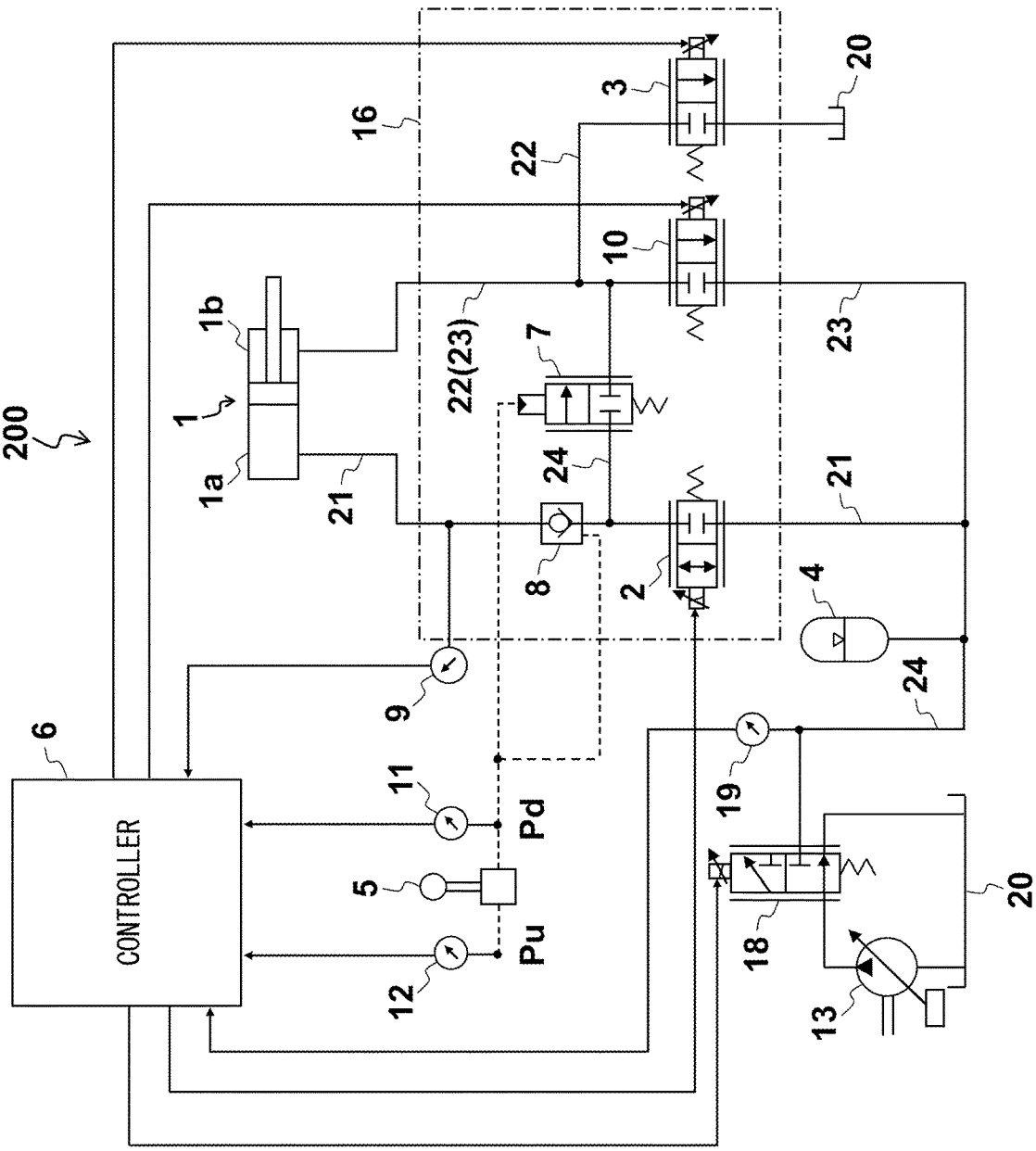
FIG. 2 is a circuit diagram of a hydraulic drive system according to a first embodiment of the present invention.

FIG. 2 is a circuit diagram of the hydraulic drive system in a first embodiment of the present invention.
(Configuration)
The configuration of the hydraulic drive system 200 will be described referring to FIG. 2.

The accumulator 4 is a hydraulic apparatus that stores the return fluid from the boom cylinder 1, and supplies the hydraulic fluid at the time of driving the boom cylinder 1. The accumulator 4 and the bottom-side fluid chamber 1$a$ of the boom cylinder 1 are connected with each other through a hydraulic fluid line 21, and a control valve 2 and a pilot check valve 8 are disposed in the hydraulic fluid line 21. The control valve 2, by receiving a control signal from the controller 6, provides or interrupts communication in the hydraulic fluid line 21. The pilot check valve 8 is opened only while a boom lowering pilot pressure Pd described later is generated, and is kept in a closed state when the boom lowering pilot pressure Pd is not generated. As a result, exclusive of the time of a boom lowering operation, the pressure inside the bottom-side fluid chamber 1$a$ of the boom cylinder 1 is maintained, so that an unintended shrinking operation of the boom cylinder 1 can be prevented. A pressure sensor 9 for sensing the pressure inside the bottom-side fluid chamber 1$a$ is provided in a line part of the hydraulic fluid line 21, which connects the bottom-side fluid chamber 1$a$ with the pilot check valve 8, and a signal from the pressure sensor 9 is inputted to the controller 6.

A rod-side fluid chamber 1$b$ of the boom cylinder 1 and the tank 20 are connected with each other by a hydraulic fluid line 22, and a control valve 3 is disposed in the hydraulic fluid line 22. The control valve 3, by receiving a control signal from the controller 6, provides or interrupts communication in the hydraulic fluid line 22.

The rod-side fluid chamber 1$b$ of the boom cylinder 1 and the accumulator 4 are connected with each other by a hydraulic fluid line 23, and a control valve 10 is disposed in the hydraulic fluid line 23. The control valve 10, by receiving a control signal from the controller 6, provides or interrupts communication in the hydraulic fluid line 23.

A hydraulic pump 13 is a hydraulic apparatus mainly for accumulating pressure in the accumulator 4, and a discharge port of the hydraulic pump 13 is connected to the accumulator 4 through a control valve 18 and a hydraulic fluid line 24. The control valve 18, by receiving a control signal from the controller 6, is changed over from a normal position depicted in the figure. When the control valve 18 is in the normal position, the fluid delivered from the hydraulic pump 13 is discharged to the tank 20, and, when the control valve 18 is changed over from the normal position, the fluid delivered from the hydraulic pump 13 is stored in the accumulator 4. A pressure sensor 19 for sensing the pressure inside the accumulator 4 is provided in the hydraulic fluid line 24, and a signal from the pressure sensor 19 is inputted to the controller 6.

A line part of the hydraulic fluid line 21, which connects the pilot check valve 8 with the control valve 2, is connected through the hydraulic fluid line 24 to a part of the hydraulic fluid line 23, which connects the rod-side fluid chamber 1$b$ with the control valve 10, and a control valve 7 is disposed in the hydraulic fluid line 24. The control valve 7 is, by the boom lowering pilot pressure Pd described later, changed over from an interruption position depicted in the figure to a communication position. As a result, at the time of a boom lowering operation, the bottom side of the boom cylinder 1 is made to communicate with the rod side, and the bottom side of the boom cylinder 1 is raised in pressure.

When the operation lever 5 is operated in a boom raising direction by an operator, a boom raising pilot pressure Pu is generated, whereas when the operation lever 5 is operated in a boom lowering direction, the boom lowering pilot pressure Pd is generated. The boom lowering pilot pressure Pd is sensed by a pressure sensor 11, whereas the boom raising pilot pressure Pu is sensed by a pressure sensor 12, and signals from the pressure sensors 11 and 12 are inputted to the controller 6.

Figure 3:
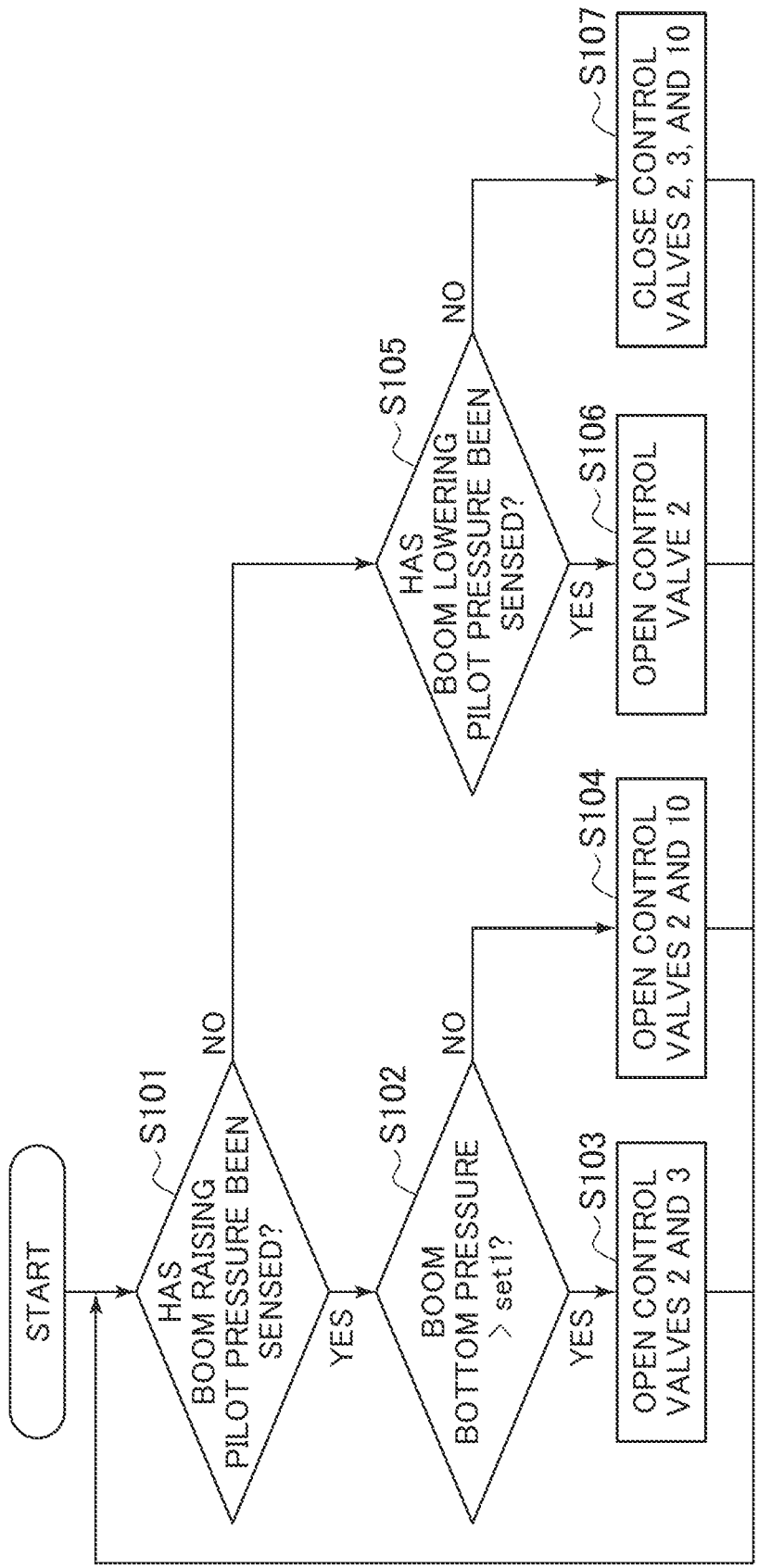
FIG. 3 is a diagram depicting a control flow according to driving of a boom cylinder by a controller in the first embodiment of the present invention.
Figure 4:
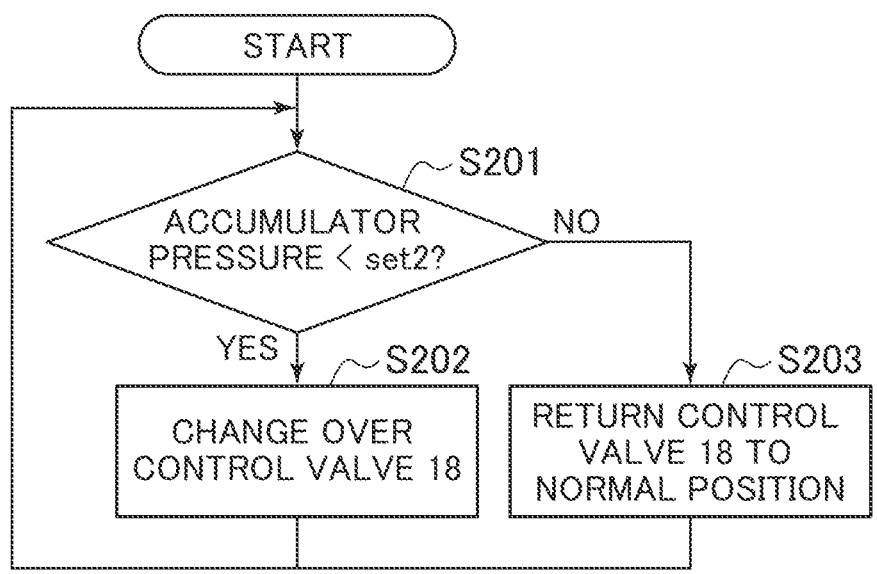
FIG. 4 is a diagram depicting a control flow according to a pressure accumulation operation of an accumulator by the controller in the first embodiment of the present invention.

Next, the contents of processing of the controller 6 will be described using FIGS. 3 and 4. FIG. 3 represents a control flow concerning driving of the boom cylinder 1, and FIG. 4 represents a control flow concerning a pressure accumulation operation of the accumulator 4. These control flows are started, for example, when a key-switch not illustrated is turned ON, and are simultaneously carried out concurrently.

First, referring to FIG. 3, a control flow concerning driving of the boom cylinder 1 will be described.

The controller 6, first, determines whether or not the boom raising pilot pressure Pu has been sensed by the pressure sensor 12 (step S101).

When the determination in step S101 is Yes (the boom raising pilot pressure Pu has been sensed), it is determined whether or not the bottom pressure of the boom cylinder 1 sensed by the pressure sensor 9 is higher than a predetermined pressure set1 (step 102).

When the determination in step S102 is Yes (the bottom pressure of the boom cylinder 1 is higher than the predetermined pressure set1), the control valves 2 and 3 are opened while the control valve 10 is kept closed (step S103), and the control returns to step S101. By this, the boom cylinder 1 can be put into an extending operation while suppressing a back pressure on the rod side.

When the determination in step S102 is No (the bottom pressure of the boom cylinder 1 is equal to or lower than the predetermined pressure set1), the control valves 2 and 10 are opened while the control valve 3 is kept closed (step S104), and the control returns to step S101. By this, the boom cylinder 1 can be put into an extending operation while a back pressure is generated on the rod side. In this instance, the pressure difference between the boom cylinder 1 and the accumulator 4 is reduced, and a pressure loss at the time of supplying hydraulic fluid from the accumulator 4 to the boom cylinder 1 is suppressed, so that the boom cylinder 1 can be driven efficiently.

When the determination in step S101 is No (the boom raising pilot pressure Pu has not been sensed), it is determined whether or not a boom lowering pilot pressure Pd has been sensed in the pressure sensor 11 (step S105).

When the determination in step S105 is Yes (the boom lowering pilot pressure Pd has been sensed), the control valve 2 is opened while the control valves 3 and 10 are kept closed (step S106), and the control returns to step S101. In this instance, the control valve 7 is changed over to a communication position by the boom lowering pilot pressure Pd. By this, a portion of the hydraulic fluid discharged from the bottom side of the boom cylinder 1 is accumulated into the accumulator through the control valve 2, whereas a remaining part of the hydraulic fluid is supplied to the rod side of the boom cylinder 1 through the control valve 7, and the boom cylinder 1 is put into a shrinking operation.

When the determination in step S105 is No (the boom lowering pilot pressure Pd has not been sensed), the control valves 2, 3, and 10 are closed (step S107), and the control returns to step S101. As a result, hydraulic fluid lines 21 to 23 for supplying and discharging the hydraulic fluid to and from the boom cylinder 1 are all interrupted, so that the boom cylinder 1 is kept in a standstill state.

Next, referring to FIG. 4, a control flow concerning a pressure accumulation operation of the accumulator 4 will be described.

The controller 6, first, determined whether or not the pressure of the accumulator 4 (accumulator pressure) sensed by the pressure sensor 19 is lower than a predetermined pressure set2 (step S201). The predetermined pressure set2 here is set at a pressure on the order that the hydraulic fluid can be supplied to the bottom-side fluid chamber 1a of the boom cylinder 1 even in a state in which a back pressure is generated on the rod side by opening the control valve 7.

When the determination in step S201 is Yes (the accumulator pressure is lower than the predetermined pressure set2), the control valve 18 is changed over from a normal position and a delivery port of the hydraulic pump 13 is connected to the accumulator 4 (step S202), and the control returns to step S201. As a result, the fluid delivered from the hydraulic pump 13 is accumulated in the accumulator 4, and the pressure of the accumulator 4 is kept to be equal to or higher than the predetermined pressure set2, and, therefore, the boom cylinder 1 can be driven at an optional timing.

When the determination in step S201 is No (the accumulator pressure is equal to or higher than the predetermined pressure set 2), the control valve 18 is returned to the normal position and the delivery port of the hydraulic pump 13 is connected to the tank 20 (step S202), and the control returns to S201. By this, pressure accumulation in the accumulator 4 is not caused more than necessary by the hydraulic pump 13, and, therefore, needless energy consumption can be restrained.

(Operation)

Referring to FIG. 2, an operation of the hydraulic drive system 200 will be described.

First, a lowering operation of the boom 105 (a shrinking operation of the boom cylinder 1) will be described.

When the operation lever 5 is operated in a boom lowering direction, holding of pressure in the pilot check valve 8 is released by the boom lowering pilot pressure Pd and the control valve 7 is opened, and the bottom side of the boom cylinder 1 is made to communicate with the rod side and is raised in pressure. In addition, simultaneously, the controller 6 opens the control valve 2, whereby the hydraulic fluid on the bottom side flows into the accumulator 4 to regenerate energy, and the boom cylinder 1 shrinks. In this instance, pressure accumulation in the accumulator 4 is caused by the raised bottom pressure.

Next, a raising operation of the boom 105 (an extending operation of the boom cylinder 1) will be described.

When the operation lever 5 is operated in a boom raising direction, the controller 6 determines that a boom raising pilot pressure Pu has been sensed, opens the control valve 2 and opens either one of the control valves 3 and 10 according to the bottom pressure of the boom cylinder 1. Specifically, where the bottom pressure of the boom cylinder 1 is higher than the predetermined pressure set1, the control valve 3 is opened while the control valve 10 is kept closed to thereby suppress the back pressure on the rod side, whereby the boom cylinder 1 is extended efficiently. In this instance, since the pressure difference between the pressure in the accumulator 4 and the bottom pressure is small, a large pressure loss is not generated in the control valve 2. On the other hand, when the bottom pressure of the boom cylinder 1 is equal to or lower than the predetermined pressure set1, the control valve 10 is opened while the control valve 3 is kept closed to thereby connect the rod side of the boom cylinder 1 to the accumulator 4, and to generate a back pressure on the rod side. As a result, since the pressure on the bottom side in the boom cylinder 1 is also raised, the pressure difference between the bottom side of the boom cylinder 1 and the accumulator 4 is reduced, so that a pressure loss generated in the control valve 2 can be reduced. In this instance, since the back pressure generated on the rod side in the boom cylinder 1 is regenerated as it is in the accumulator 4 through the control valve 10, energy loss due to generation of the back pressure is not generated.

(Effect)

In the present embodiment, the construction machine 100 including the tank 20 that reserves the hydraulic fluid, the hydraulic cylinder 1, the accumulator 4 that accumulates the return fluid from the hydraulic cylinder 1, the first control valve 2 disposed in the first hydraulic fluid line 21 connecting the bottom-side fluid chamber 1a of the hydraulic cylinder 1 with the accumulator 4, and the second control valve 3 disposed in the second hydraulic fluid line 22 connecting the rod-side fluid chamber 1b of the hydraulic cylinder 1 with the tank 2, includes the third control valve 10 disposed in the third hydraulic fluid line 23 connecting the rod-side fluid chamber 1b with the accumulator 4, and the fourth control valve 7 disposed in the fourth hydraulic fluid line 24 connecting a line part of the first hydraulic fluid line 21, which connects the bottom-side fluid chamber 1a with the first control valve 2, and a line part of the third hydraulic fluid line 23, which connects the rod-side fluid chamber with the third control valve 10, with each other.

According to the present embodiment configured as above, at the time of driving the hydraulic cylinder 1 to shrink, the fourth control valve 7 is opened to cause the bottom side of the hydraulic cylinder 1 to communicate with the rod side to thereby raise the bottom side, and the first control valve 2 is opened to cause the bottom side to communicate with the accumulator 4, whereby the return fluid from the bottom side can be accumulated at a high pressure in the accumulator 4. In addition, at the time of driving the hydraulic cylinder 1 to extend, the fourth control valve 7 is closed to interrupt the communication between the bottom side and the rod side of the hydraulic cylinder 1, and the first control valve 2 is opened to cause the bottom side to communicate with the accumulator 4, and either one of the second control valve 3 and the third control valve 10 is opened, whereby hydraulic fluid can be supplied from the accumulator 4 to the bottom side while adjusting the back pressure on the rod side. As a result, the pressure difference between the accumulator 4 and the bottom side of the hydraulic cylinder 1 can be reduced, and, therefore, pressure loss at the first control valve 2 can be reduced.

In addition, the construction machine 100 according to the present embodiment includes the operation lever 5 for issuing an instruction on an operation of the hydraulic cylinder 1, and the controller 6 that performs such a control as to open the first control valve 2 and to open either one of the second control valve 3 and the third control valve 10 when an extending operation of the hydraulic cylinder 1 is instructed through the operation lever 5, in which the controller 6 performs such a control as to close the fourth control valve 7 when the extending operation of the hydraulic cylinder 1 is instructed through the operation lever 5, and to open the fourth control valve 7 when a shrinking operation of the hydraulic cylinder 1 is instructed through the operation lever 5.

With such a configuration, where the shrinking operation of the hydraulic cylinder 1 is instructed through the operation lever 5, the fourth control valve 7 is opened to cause the bottom side of the hydraulic cylinder 1 to communicate with the rod side and be raised in pressure, and the first control valve 2 is opened to cause the bottom side to communicate with the accumulator 4, so that the return fluid on the bottom side can be accumulated at high pressure in the accumulator 4. In addition, where the extending operation of the hydraulic cylinder 1 is instructed through the operation lever 5, the fourth control valve 7 is closed to thereby interrupt the communication between the bottom side and the rod side of the hydraulic cylinder 1, and either one of the second control valve 3 and the third control valve 10 is opened to cause the rod side to communicate with the tank 20 or the accumulator 4, so that a back pressure on the rod side can be adjusted.

Besides, the construction machine 100 according to the present embodiment includes the first pressure sensor 9 for sensing the pressure in the bottom-side fluid chamber 1a, in which the controller 6 performs such a control as to close the third control valve 10 and to open the second control valve 3 when the extending operation of the hydraulic cylinder 1 is instructed through the operation lever 5 and when the pressure in the bottom-side fluid chamber 1a sensed by the first pressure sensor 9 is higher than the first predetermined pressure set1, and as to close the second control valve 3 and to open the third control valve 10 when the extending operation of the hydraulic cylinder 1 is instructed through the operation lever 5 and when the pressure in the bottom-side fluid chamber 1a sensed by the first pressure sensor 9 is equal to or lower than the first predetermined pressure set1.

With such a configuration, where the extending operation of the hydraulic cylinder 1 is instructed through the operation lever 5 and where the pressure in the bottom-side fluid chamber 1a is equal to or lower than the first predetermined pressure set1, the rod side is made to communicate with the accumulator 4 to generate a back pressure, and the pressure difference between the accumulator 4 and the bottom side of the hydraulic cylinder 1 is reduced, whereby pressure loss in the control valve 2 can be reduced. Besides, where the extending operation of the hydraulic cylinder 1 is instructed through the operation lever 5 and where the pressure in the bottom-side fluid chamber 1a is higher than the first predetermined pressure set1, the rod side is made to communicate with the tank 20 to suppress a back pressure, whereby the hydraulic cylinder 1 can be put into the extending operation efficiently.

In addition, the construction machine 100 according to the present embodiment includes the hydraulic pump 13, the fifth control valve 18 that selectively connects the delivery port of the hydraulic pump 13 to the accumulator 4 or the tank 20, and the second pressure sensor 19 for sensing the pressure in the accumulator 4, in which the controller 6 controls the fifth control valve 18 such that the delivery port of the hydraulic pump 13 is connected to the tank 20 when the pressure in the accumulator 4 sensed by the second pressure sensor 19 is equal to or higher than the second predetermined pressure set2, and controls the fifth control valve 18 such that the delivery port of the hydraulic pump 13 is connected to the accumulator 4 when the pressure in the accumulator 4 sensed by the second pressure sensor 19 is lower than the second predetermined pressure set2.

With such a configuration, the pressure in the accumulator 4 is kept equal to or higher than the second predetermined pressure set2, and, therefore, the hydraulic cylinder 1 can be driven at an optional timing.

Embodiment 2

Figure 5:
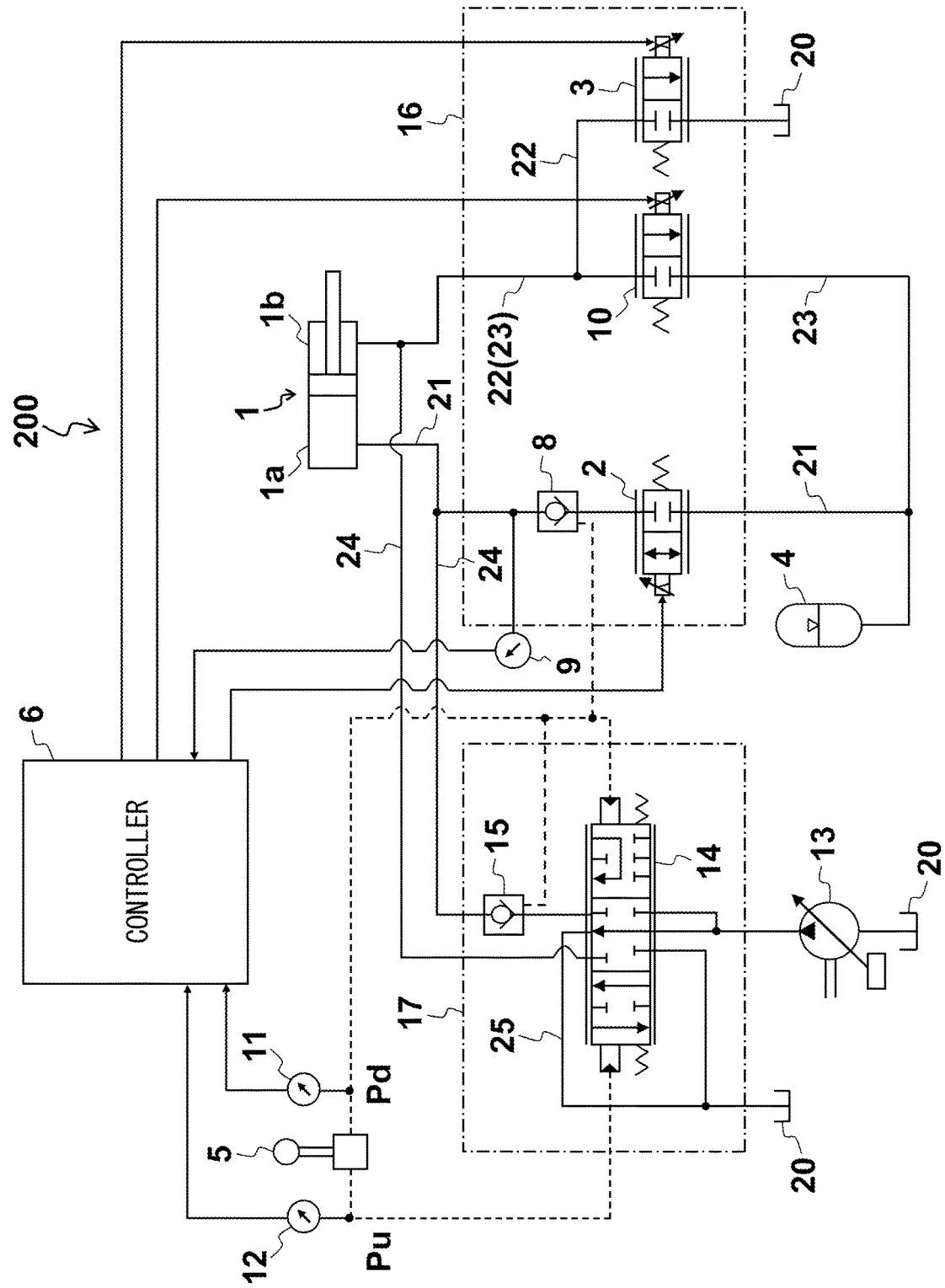
FIG. 5 is a circuit diagram of a hydraulic drive system in a second embodiment of the present invention.

FIG. 5 is a circuit diagram of a hydraulic drive system according to a second embodiment of the present invention.

The hydraulic drive system 200 according to the present embodiment includes a directional control valve 14 for supplying the fluid delivered from the hydraulic pump 13 to the boom cylinder 1, and for making the hydraulic fluid discharged from the boom cylinder 1 flow to the tank 20. The directional control valve 14 is changed over from a neutral position in the figure to a left side position by the boom raising pilot pressure Pu, and is changed over from the neutral position to the right side position by the boom lowering pilot pressure Pd. The directional control valve 14 changed over to the left side position causes the delivery port of the hydraulic pump 13 to communicate with the bottom-side fluid chamber 1a of the boom cylinder 1, and causes the rod-side fluid chamber 1b to communicate with the tank 20. The directional control valve 14 changed over to the right side position causes the bottom-side fluid chamber 1a of the boom cylinder 1 to communicate with the rod-side fluid chamber 1b. Thus, the functions of the control valve 7 (depicted in FIG. 2) in the first embodiment are mounted to the right side position of the directional control valve 14.

Further, in the present embodiment, the pilot check valve 15 is disposed between the directional control valve 14 and the hydraulic cylinder 1, and the directional control valve 14 and the pilot check valve 15 are configured as a united valve block 17, whereas the other valves are configured as a valve block 16. In other words, the valve block 17 configures a main control valve which has been mounted on a conventional hydraulic excavator and which is for controlling the supply of hydraulic fluid from the hydraulic pump to the actuator, whereas the valve block 16 is configured as a hybrid valve for controlling the supply of hydraulic fluid to the accumulator.

(Effect)

The construction machine 100 according to the present embodiment includes the hydraulic pump 13, and the fourth control valve 14 is the directional control valve 14 capable of supplying the hydraulic fluid delivered from the hydraulic pump 13 to the hydraulic cylinder 1 and capable of discharging the return fluid from the hydraulic cylinder 1 to the tank 20.

According to the present embodiment configured as above, the following effects can be obtained in addition to the effects of the first embodiment.

The function of causing the bottom side of the boom cylinder 1 to communicate with the rod side and to be raised in pressure is mounted at a right side position of the directional control valve 14, whereby the control valve 7 (depicted in FIG. 2) in the first embodiment is made unnecessary. Besides, the hydraulic fluid can be supplied from the hydraulic pump 13 to the hydraulic cylinder 1 through the directional control valve 14, whereby charging of the accumulator 4 is made to be unnecessary, and, therefore, the control valve 18 and the pressure sensor 19 (depicted in FIG. 2) in the first embodiment are also made unnecessary. As a result, the hydraulic circuit can be prevented from becoming complicated.

In addition, the construction machine 100 according to the present embodiment includes: the first pilot check valve 8 disposed at a line part of the first hydraulic fluid line 21, which connects the bottom-side fluid chamber 1a with the first control valve 2; the second pilot check valve 15 disposed in a line part of the fourth hydraulic fluid line 24, which connects the bottom-side fluid chamber 1a with the directional control valve 14; the first valve block 16 which unites together the first control valve 2, the second control valve 3, the third control valve 10, and the first pilot check valve 8; and the second valve block 17 which unites together the directional control valve 14 and the second pilot check valve 15.

With such a configuration, the construction machine can be hybridized by only adding on a hybrid valve to the conventional main control valve, and leak of the boom cylinder 1 can be securely prevented by the pilot check valves 8 and 15 provided respectively in the main control valve and the hybrid valve.

While the embodiments of the present invention have been described in detail above, the present invention is not limited to the above-described embodiments, and includes various modifications. For example, the above embodiments have been described in detail for easily understandably explaining the present invention, and are not limited to those which include all the described configurations. In addition, to the configuration of an embodiment, a part of the configuration of another embodiment can be added, or a part of the configuration of an embodiment can be deleted or can be replaced by a part of another embodiment.

DESCRIPTION OF REFERENCE CHARACTERS

1: Boom cylinder (hydraulic cylinder)
2: Control valve (first control valve)
3: Control valve (second control valve)
4: Accumulator
5: Operation lever
6: Controller
7: Control valve (fourth control valve)
8: Pilot check valve (first pilot check valve)
9: Pressure sensor (first pressure sensor)
10: Control valve (third control valve)
11: Pressure sensor
12: Pressure sensor
13: Hydraulic pump
14: Directional control valve (fourth control valve)
15: Pilot check valve (second pilot check valve)
16: Valve block (first valve block)
17: Valve block (second valve block)
18: Control valve (fifth control valve)
19: Pressure sensor (second pressure sensor)
20: Tank
21: Hydraulic fluid line (first hydraulic fluid line)
22: Hydraulic fluid line (second hydraulic fluid line)
23: Hydraulic fluid line (third hydraulic fluid line)
24: Hydraulic fluid line (fourth hydraulic fluid line)
25: Hydraulic fluid line
26: Control valve
100: Hydraulic excavator (construction machine)
101: Track structure
102: Swing structure
103: Work device
104: Swing motor
105: Boom
106: Arm
107: Bucket
108: Arm cylinder
109: Bucket cylinder
110: Cab
111: Counter weight
112: Machine room
113: Control valve
200: Hydraulic drive system

The invention claimed is:

1. A construction machine comprising:
a tank that reserves a hydraulic fluid;
a hydraulic cylinder;
an accumulator that accumulates a return fluid from the hydraulic cylinder;
a first control valve disposed in a first hydraulic fluid line connecting a bottom-side fluid chamber of the hydraulic cylinder with the accumulator; and
a second control valve disposed in a second hydraulic fluid line connecting a rod-side fluid chamber of the hydraulic cylinder with the tank, wherein
the construction machine includes:
a third control valve disposed in a third hydraulic fluid line connecting the rod-side fluid chamber with the accumulator;
a fourth control valve disposed in a fourth hydraulic fluid line connecting a line part of the first hydraulic fluid line, the line part connecting the bottom-side fluid chamber with the first control valve, and a line part of the third hydraulic fluid line, the line part connecting the rod-side fluid chamber with the third control valve, with each other;
an operation lever for issuing an instruction on an operation of the hydraulic cylinder;
a controller that controls the first control valve, the second control valve, and the third control valve according to an instruction inputted through the operation lever; and
a first pressure sensor that senses a pressure inside the bottom-side fluid chamber,
the fourth control valve is configured
to close in a case where an extending operation of the hydraulic cylinder is instructed through the operation lever, and
to open in a case where a shrinking operation of the hydraulic cylinder is instructed through the operation lever, and
the controller is configured
to open the first control valve and the second control valve and close the third control valve in a case where an extending operation of the hydraulic cylinder is instructed through the operation lever and the pressure inside the bottom-side fluid chamber sensed by the first pressure sensor is higher than a first predetermined pressure, and to open the first control valve and the third control valve and close the second control valve in a case where an extending operation of the hydraulic cylinder is instructed through the operation lever and the pressure inside the bottom-side fluid chamber sensed by the first pressure sensor is equal to or lower than the first predetermined pressure.

2. A construction machine comprising:
a tank that reserves a hydraulic fluid;
a hydraulic cylinder;
an accumulator that accumulates a return fluid from the hydraulic cylinder;
a first control valve disposed in a first hydraulic fluid line connecting a bottom-side fluid chamber of the hydraulic cylinder with the accumulator;
a second control valve disposed in a second hydraulic fluid line connecting a rod-side fluid chamber of the hydraulic cylinder with the tank,
a third control valve disposed in a third hydraulic fluid line connecting the rod-side fluid chamber with the accumulator; and
a fourth control valve disposed in a fourth hydraulic fluid line connecting a line part of the first hydraulic fluid line, the line part connecting the bottom-side fluid chamber with the first control valve, and a line part of the third hydraulic fluid line, the line part connecting the rod-side fluid chamber with the third control valve, with each other, wherein
the construction machine includes a hydraulic pump, and
the fourth control valve is a directional control valve capable of supplying a hydraulic fluid delivered from the hydraulic pump to the hydraulic cylinder and discharging a return fluid from the hydraulic cylinder to the tank.

3. A construction machine comprising:
a tank that reserves a hydraulic fluid;
a hydraulic cylinder;
an accumulator that accumulates a return fluid from the hydraulic cylinder;
a first control valve disposed in a first hydraulic fluid line connecting a bottom-side fluid chamber of the hydraulic cylinder with the accumulator;
a second control valve disposed in a second hydraulic fluid line connecting a rod-side fluid chamber of the hydraulic cylinder with the tank,
a third control valve disposed in a third hydraulic fluid line connecting the rod-side fluid chamber with the accumulator; and
a fourth control valve disposed in a fourth hydraulic fluid line connecting a line part of the first hydraulic fluid line, the line part connecting the bottom-side fluid chamber with the first control valve, and a line part of the third hydraulic fluid line, the line part connecting the rod-side fluid chamber with the third control valve, with each other, wherein
the construction machine includes:
a first pilot check valve disposed in a line part of the first hydraulic fluid line, the line part connecting the bottom-side fluid chamber with the first control valve;
a second pilot check valve disposed in a line part of the fourth hydraulic fluid line, the line part connecting the bottom-side fluid chamber with the directional control valve;
a first valve block that unites together the first control valve, the second control valve, the third control valve, and the first pilot check valve; and
a second valve block that unites together the directional control valve and the second pilot check valve.

4. A construction machine comprising:
a tank that reserves a hydraulic fluid;
a hydraulic cylinder;
an accumulator that accumulates a return fluid from the hydraulic cylinder;
a first control valve disposed in a first hydraulic fluid line connecting a bottom-side fluid chamber of the hydraulic cylinder with the accumulator;
a second control valve disposed in a second hydraulic fluid line connecting a rod-side fluid chamber of the hydraulic cylinder with the tank,
a third control valve disposed in a third hydraulic fluid line connecting the rod-side fluid chamber with the accumulator; and
a fourth control valve disposed in a fourth hydraulic fluid line connecting a line part of the first hydraulic fluid line, the line part connecting the bottom-side fluid chamber with the first control valve, and a line part of the third hydraulic fluid line, the line part connecting the rod-side fluid chamber with the third control valve, with each other, wherein
the construction machine includes:
a hydraulic pump;
a fifth control valve that selectively connects a delivery port of the hydraulic pump to the accumulator or the tank; and
a second pressure sensor that senses a pressure inside the accumulator, wherein
the controller is configured control the fifth control valve such that the delivery port of the hydraulic pump is connected to the tank in a case where the pressure inside the accumulator sensed by the second pressure sensor is equal to or higher than a second predetermined pressure, and that the delivery port of the hydraulic pump is connected to the accumulator second pressure the pressure inside the accumulator sensed by the second pressure sensor is lower than the second predetermined pressure.

* * * * *